Nov. 30, 1943.   S. A. BJERGEL   2,335,729
CLOSING VALVE
Filed Nov. 4, 1941

Inventor
S. A. Bjergel
By: Glascock Downing &Seebold
Attys.

Patented Nov. 30, 1943

2,335,729

UNITED STATES PATENT OFFICE 2,335,729

CLOSING VALVE

Sven Agne Bjergel, Stockholm, Sweden, assignor to Telefonaktiebolaget L. M. Ericsson, Stockholm, Sweden, a company of Sweden Application November 4, 1941, Serial No. 417,870
In Sweden February 13, 1940

2 Claims. (Cl. 137—153)

The present invention refers to an easily controlled valve for liquid and gaseous mediums especially for air, the governing of which requires a minimum of force.

This will be attained thereby that the medium flowing to the valve is forced to effect the work required for opening and closing the valve and thus the governing of the valve will be effected by regulating the pressure in a chamber placed at the side of the main air path through the valve. This pressure acts upon a membrane, spring-controlled piston or the like, which causes the flow through the valve to be entirely or partly closed when the pressure in the chamber reaches a certain limit.

In the drawing

Figure 1:
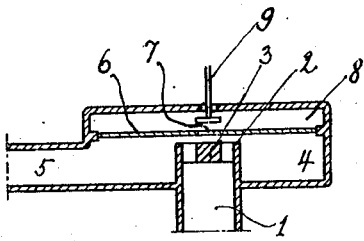
Figure 1 is a sectional view of a valve device embodying my invention.

The functioning of the embodiment of the invention according to Fig. 1 is the following.

Figure 5:
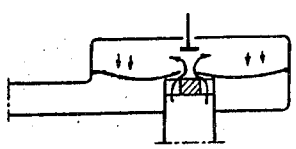
Figures 5 and 6 are diagrammatic views of the valve device of Figure 1, showing the valve in closed and open positions, respectively.

When the valve is connected to a conduit for air pressure, air will flow through the channel 1, and the air will then partly be pressed out between the seat 2 and the membrane 6 and partly through the hole 7 in the membrane into the chamber 8. This will cause an increase of the pressure in the closed chamber 8, provided that the valve 9 is closed. The membrane 6 is then pressed down against the seat 2 so effectively that the progress of the air will be impeded between the membrane and the seat. Due to the inclination of the membrane around the seat, a small elevation is obtained in the centre of the membrane just opposite the plug 3, allowing a small passage of air through the hole 7. The object of this small air current is to substitute the air which through leakage in the periphery of the membrane for example or in the valve 9 might cause a decrease of pressure in the chamber 8. The valve is now closed as shown by Fig. 5.

Figure 6:
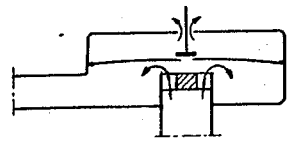

When the valve shall be opened, the valve 9 in the outer wall of the chamber 8 is opened. The air now passes out from chamber 8 through the valve and a decrease of pressure in the chamber is obtained, thus enabling the air coming from the air inlet channel 1 to remove the membrane from the seat. Air from the air inlet channel now issues into the chamber 4 and into the air outlet channel 5. At the same time air issues through the hole 7 in the membrane into the chamber 8. This air, however, causes no significant increase of pressure in the chamber, as the valve 9 is quite open all the time. This small increase of pressure in the chamber 8 is not capable of causing such an important inclination downwards of the membrane 6 against the seat 2 that the air from the channel 1 will be impeded in its escape. The valve is now open, see Fig. 6, and rests in this position as long as the valve 9 is open. If the valve 9 is closed, the pressure in the chamber 8 increases again and the membrane is pressed down against the seat. The valve thus will close again. The air outlet of the valve 9 may of course end in the main air outlet channel 5.

Figure 2:
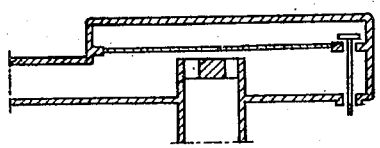
Figures 2, 3 and 4 are sectional views of modifications of my valve device.
Figure 3:
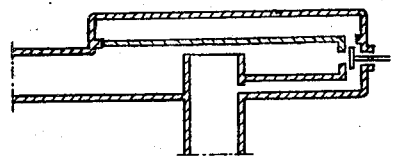
Figure 4:
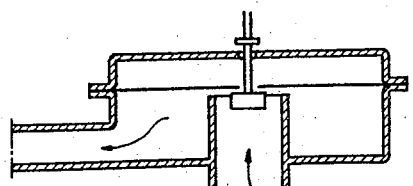

The Figures 2, 3 and 4 show different ways to regulate by means of a valve the pressure above the membrane so that the same is pressed against the seat of the main air inlet channel and raised from it respectively, causing a closing and an opening respectively of the valve.

As shown by the above the working of the valve is made possible by the fact that the pressure required to close the valve acts upon the main part of the surface of the membrane and the piston respectively, while the pressure which simultaneously tries to open the valve acts only upon a part of this surface, that is, the cross section area of the air inlet tube.

I claim:

1. A valve structure comprising a hollow body having an outlet, a diaphragm arranged in and dividing said body into two chambers, an inlet pipe projecting into said body and having its end disposed for engagement by the medial portion of said diaphragm, a plug arranged centrally within said end of the pipe, a second outlet in said body, said diaphragm having an aperture in line with said plug, and a valve for alternately closing the second outlet and said aperture.

2. A valve structure comprising a body having an outlet, a diaphragm in said body having an aperture therein, an inlet pipe projecting into said body and constituting a seat to be engaged by the medial portion of said diaphragm, a plug arranged centrally within said pipe opposite the aperture in said diaphragm, and a valve for closing said aperture.

SVEN AGNE BJERGEL.